(12) United States Patent
McCain et al.

(10) Patent No.: US 11,684,848 B2
(45) Date of Patent: Jun. 27, 2023

(54) METHOD TO IMPROVE USER UNDERSTANDING OF XR SPACES BASED IN PART ON MESH ANALYSIS OF PHYSICAL SURFACES

(71) Applicants: Sony Group Corporation, Tokyo (JP); Sony Corporation of America, New York, NY (US)

(72) Inventors: Robert M. McCain, San Diego, CA (US); Tsubasa Tsukahara, Los Angeles, CA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 0 days.

(21) Appl. No.: 17/488,254

(22) Filed: Sep. 28, 2021

(65) Prior Publication Data
US 2023/0101913 A1 Mar. 30, 2023

(51) Int. Cl.
A63F 13/25 (2014.01)
A63F 13/56 (2014.01)
A63F 13/428 (2014.01)

(52) U.S. Cl.
CPC ............ *A63F 13/25* (2014.09); *A63F 13/428* (2014.09); *A63F 13/56* (2014.09); *A63F 2300/8082* (2013.01)

(58) Field of Classification Search
CPC ........ A63F 13/25; A63F 13/428; A63F 13/56; A63F 2300/8082
See application file for complete search history.

(56) References Cited

U.S. PATENT DOCUMENTS

| | | | | |
|---|---|---|---|---|
| 1,497,356 | A * | 6/1924 | Comstock | G02B 27/145 359/638 |
| 5,696,892 | A * | 12/1997 | Redmann | G06T 13/20 348/E5.022 |
| 7,610,558 | B2 * | 10/2009 | Morita | G06T 19/006 463/32 |
| 9,754,419 | B2 * | 9/2017 | Petrovskaya | G02B 27/01 |
| 10,255,302 | B1 | 4/2019 | Cosic | |
| 10,445,925 | B2 * | 10/2019 | Tokubo | G02B 27/01 |
| 10,719,987 | B1 * | 7/2020 | Tanumihardja | H04N 5/765 |
| 10,908,771 | B2 * | 2/2021 | Berquam | G06F 3/011 |
| 10,928,973 | B2 | 2/2021 | Shuster | |
| 10,964,111 | B2 * | 3/2021 | Price | G06V 10/22 |
| 11,410,395 | B2 * | 8/2022 | Velasquez | G06T 19/006 |

(Continued)

FOREIGN PATENT DOCUMENTS

EP 3459071 3/2019

*Primary Examiner* — Seng H Lim
(74) *Attorney, Agent, or Firm* — Trellis IP Law Group, PC (57) ABSTRACT

A method for providing a user with an improved understanding of an XR space in which the user is playing a video game includes: continuously tracking a user-controlled character in the video game; accessing a previously generated spatial mapping mesh (SMM) of surfaces of real elements present in the XR space, with corresponding positions and dimensions; analyzing information from the SMM on one or more real surfaces within a predetermined distance of the user-controlled character; carrying out an action based on a tracked position of the user-controlled character and, at least in part, on a result of the analysis; and making a consequence of the action visible to the user.

20 Claims, 8 Drawing Sheets

(56) References Cited

U.S. PATENT DOCUMENTS

| | | | |
|---|---|---|---|
| 2001/0022835 A1* | 9/2001 | Matsuo | H04S 7/302 379/1.01 |
| 2002/0075286 A1* | 6/2002 | Yonezawa | H04N 13/156 348/E13.059 |
| 2002/0095265 A1* | 7/2002 | Satoh | G06T 15/10 702/94 |
| 2003/0062675 A1* | 4/2003 | Noro | G06F 3/011 273/237 |
| 2005/0013005 A1* | 1/2005 | Rogers | G02B 27/0081 359/630 |
| 2012/0206452 A1* | 8/2012 | Geisner | G06V 10/26 345/419 |
| 2014/0240351 A1* | 8/2014 | Scavezze | G06F 3/04815 345/633 |
| 2014/0364227 A1* | 12/2014 | Langlois | G06F 1/1694 463/32 |
| 2016/0171770 A1* | 6/2016 | Pedrotti | G06F 3/011 345/633 |
| 2016/0171846 A1* | 6/2016 | Brav | G08B 6/00 340/407.1 |
| 2016/0225188 A1* | 8/2016 | Ruddell | G06T 19/006 |
| 2017/0232344 A1* | 8/2017 | Lim | A63F 13/65 463/31 |
| 2017/0354884 A1* | 12/2017 | Benedetto | A63F 13/493 |
| 2018/0075658 A1* | 3/2018 | Lanier | G06T 11/001 |
| 2018/0293802 A1* | 10/2018 | Hendricks | G09B 23/30 |
| 2019/0019242 A1* | 1/2019 | Bajpai | G06Q 30/0603 |
| 2019/0094981 A1* | 3/2019 | Bradski | G06F 3/017 |
| 2019/0369836 A1* | 12/2019 | Faulkner | G06F 3/04845 |
| 2020/0035024 A1* | 1/2020 | Price | G06V 10/22 |
| 2020/0097707 A1* | 3/2020 | Chou | G06F 3/011 |
| 2020/0111256 A1* | 4/2020 | Bleyer | G06F 3/011 |
| 2020/0143558 A1* | 5/2020 | Tran | A45D 44/005 |
| 2020/0249819 A1* | 8/2020 | Berquam | G06F 3/011 |
| 2020/0294313 A1* | 9/2020 | Arroyo Palacios | A63F 13/25 |
| 2020/0356917 A1* | 11/2020 | Sharma | G06Q 10/101 |
| 2020/0368616 A1* | 11/2020 | Delamont | A63F 13/213 |
| 2020/0380788 A1* | 12/2020 | Hutten | G06T 19/006 |
| 2021/0056763 A1* | 2/2021 | Molyneaux | G06T 19/006 |
| 2021/0150818 A1* | 5/2021 | Dedonato | G06T 13/20 |
| 2021/0227178 A1* | 7/2021 | Lyon | G06F 3/011 |
| 2021/0383912 A1* | 12/2021 | Jackson | A61B 5/165 |
| 2022/0174111 A1* | 6/2022 | Lopez Mendez | G06T 7/73 |
| 2022/0232104 A1* | 7/2022 | Brimhall | G06T 19/006 |

* cited by examiner

METHOD TO IMPROVE USER UNDERSTANDING OF XR SPACES BASED IN PART ON MESH ANALYSIS OF PHYSICAL SURFACES

CROSS REFERENCES TO RELATED APPLICATIONS

This application is related to the following applications:

U.S. patent application Ser. No. 17/488,245, entitled "METHOD FOR PREDEFINING IN AN XR SPACE AN ENTRYWAY CORRESPONDING TO A REAL ENTRYWAY", filed on Sep. 28, 2021;

U.S. patent application Ser. No. 17/488,247, entitled "METHOD FOR PREDEFINING A VIRTUAL ENTRYWAY AT A VIRTUAL BOUNDARY OF AN XR SPACE", filed on Sep. 28, 2021;

U.S. patent application Ser. No. 17/488,248, entitled "METHOD FOR PREDEFINING ACTIVITY ZONES IN AN EXTENDED REALITY (XR) ENVIRONMENT", filed on Sep. 28, 2021;

U.S. patent application Ser. No. 17/488,249 entitled "METHOD TO USE RECOGNITION OF NEARBY PHYSICAL SURFACES TO GENERATE NPC REACTIONS TO EVENTS", filed on Sep. 28, 2021;

U.S. patent application Ser. No. 17/488,250 entitled "METHOD FOR QUASI-RANDOM PLACEMENT OF VIRTUAL ITEMS IN AN EXTENDED REALITY (XR) SPACE", filed on Sep. 28, 2021;

U.S. patent application Ser. No. 17/488,251, entitled. "METHOD TO REGULATE JUMPS AND FALLS BY PLAYABLE CHARACTERS IN XR SPACES", filed on Sep. 28, 2021;

and U.S. patent application Ser. No. 17/488,253, entitled "METHODS FOR PREDEFINING VIRTUAL STAIRCASES CONNECTING PLATFORMS IN EXTENDED REALITY (XR) ENVIRONMENTS", filed on Sep. 28, 2021;

each of which are hereby incorporated by reference as if set forth in full in this application for all purposes.

BACKGROUND

While virtual reality (VR) technologies aim to immerse a user in artificially generated or synthesized environments, inspired by real or imaginary environments, augmented reality (AR) technologies superimpose synthesized elements onto a real environment to which the user is exposed. The term mixed reality (MR) is used to refer to technologies that combine VR and AR, allowing a user to interact in real time with real and synthesized elements. More generally, the term extended reality or XR is used to encompass all three terms, although it is often (as in this disclosure) used interchangeably with MR.

Games, marketing and training are among the main applications for XR technology. This disclosure will focus on XR games, but it should be appreciated that there are many other applications for XR technology, including, for example, product marketing, and skills training, and the ideas discussed herein could be applied to any of these areas, without departing from the spirit or scope of the invention.

A primary goal of a game developer is to provide the user with as fully immersive an experience as possible, in which virtual characters (whether user-controlled or not) can interact naturally with real and synthesized (virtual) elements, and in which the virtual characters or objects behave "naturally" even though the real elements making up the physical environments in which the user may want to play—in different rooms in their home, or office, for example—will normally be completely unknown to the game developer, and may change over time, even for the same user, in the same building. In currently available XR applications, the goal of full immersion is far from being achieved.

Consider, first, VR games in which the environments have been fully defined by design, by the game developer, and contain only virtual items, such as virtual furniture and virtual structures like counters and walls. In such games, the game developer knows exactly where all the surfaces and non-user-controlled characters are positioned, and where all characters are going to be allowed to move. It is relatively simple for the user to understand the boundaries of the space in which the game is played, the routes characters are following within that space, and to keep track of where the characters and other important objects in the game are, including of course any user-controlled (player) characters.

However, in an XR space, there are real physical surfaces present, of which the game designer has no prior knowledge. Real and virtual characters and objects of interest to the user playing the game may be out of the user's field of view, because of intervening real surfaces, for periods long enough to be confusing, even frustrating for the user. Moreover, although spatial mapping meshes (SMMs) to be described further below, can provide useful information on exposed surfaces in an XR space, mesh artifacts, inevitable with the current state of the art, can have a significant negative impact on surface integrity, and smoothness, in turn giving rise to conflicts in the user's perception between what they know to be real and what the game seems to be telling them, and to unrealistic and annoying bounces and jerky movements of characters.

Furthermore, the XR space in which a game may be played is generally defined by virtual boundaries, set up by a sealed space mesh (SSM), also to be discussed further below, which may not coincide with real physical boundaries such as walls or closed doors. Again, the user may be confused and/or irritated when a moving character in the game stops short at an invisible (to the user) virtual boundary.

There is therefore a need for methods and systems that help the user to better understand the layout of the XR space, to keep track of characters and other virtual objects of importance, and to appreciate the limitations placed on characters' movements because of the combination of real and virtual boundaries. In this way, the user's immersion in the world of the game would be supported, hopefully enhancing the quality of the user experience.

It would of course be desirable for such methods and systems to leverage currently available hardware and software applications as appropriate, and to be computationally efficient, using minimal resources in time and computing power, to perform the necessary tracking of the character's movements and analysis of their relationship to the relative positions of nearby surfaces.

SUMMARY

Embodiments generally relate to methods and systems for providing users with an improved understanding of XR spaces in which they play video games.

In one embodiment, a method comprises: continuously tracking a user-controlled character in the video game; accessing a previously generated spatial mapping mesh (SMM) of surfaces, with corresponding positions and dimensions, of real elements present in the XR space in which the user is paying the game; analyzing information from the SMM on one or more real surfaces within a predetermined distance of the user-controlled character; carrying out an action based on a tracked position of the user-controlled character and, at least in part, on a result of the analysis; and making a consequence of the action visible to the user.

In another embodiment, a system comprises: one or more processors; and logic encoded in one or more non-transitory media for execution by the one or more processors and when executed operable to: continuously track a user-controlled character in the video game; access a previously generated spatial mapping mesh (SMM) of surfaces of real elements present in the XR space, with corresponding positions and dimensions; analyze information from the SMM on one or more real surfaces within a predetermined distance of the user-controlled character; carry out an action based on a tracked position of the user-controlled character and, at least in part, on a result of the analysis; and make a consequence of the action visible to the user.

DETAILED DESCRIPTION OF EMBODIMENTS

A further understanding of the nature and the advantages of embodiments disclosed herein may be realized by reference of the remaining portions of the specification and the attached drawings.

Figure 1:
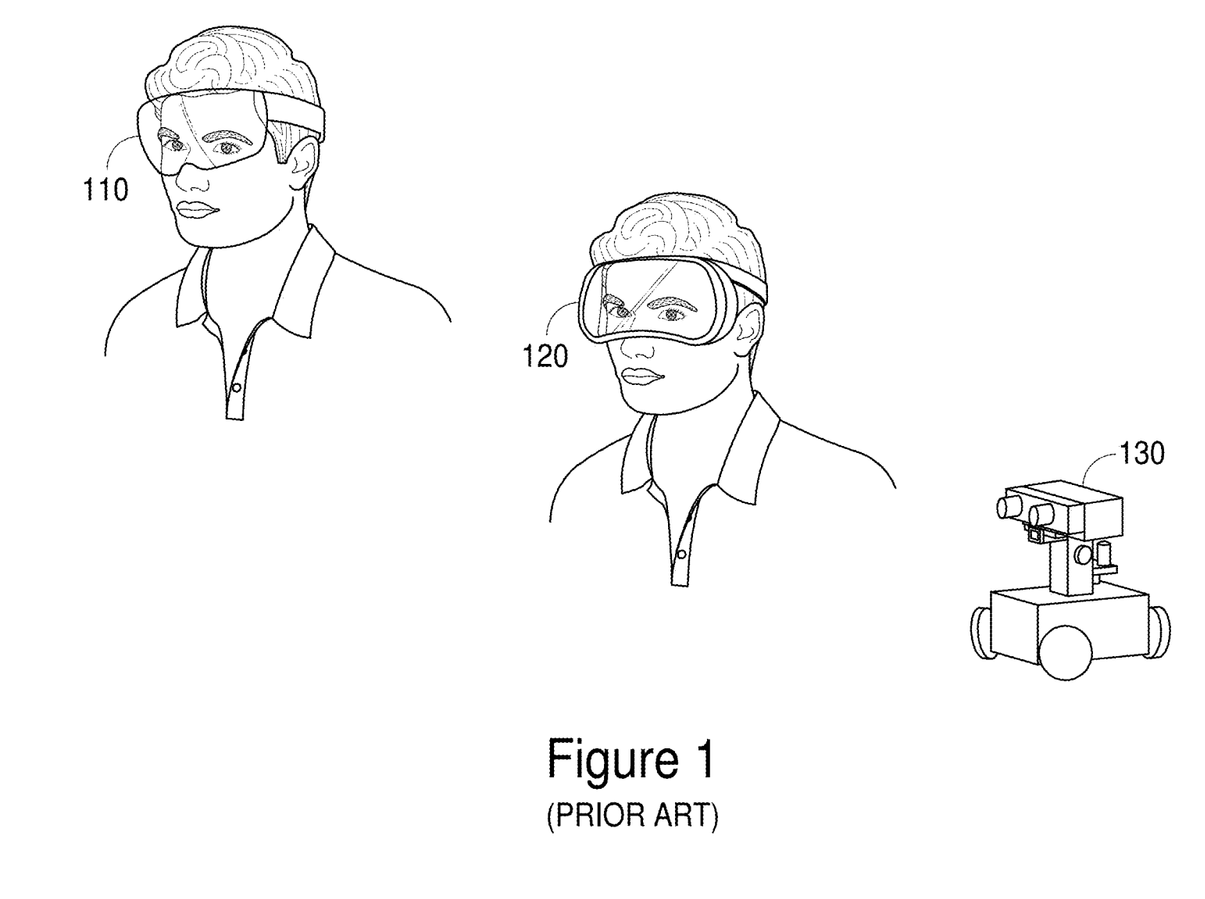
FIG. 1 (prior art) shows devices designed to generate mapping meshes that may be used in some embodiments.

Spatial mapping meshes (SMMs) may be generated by commercially available devices manufactured by gaming and other electronic companies. The devices may be head mounted, carried in the hand, or simply deployed (for example in the form of a robot) by a user to move autonomously around the space of interest, gathering data. Technologies such as e.g., LIDAR, ultrasound scanning, image analysis etc. for creating such meshes are well known and will not be discussed further herein. FIG. 1 shows two head mounted sensing and display devices, 110 and 120, and a robotic device 130, as examples of currently available devices by which SMMs can be generated. In some cases, the same devices used to generate the SMM is also used subsequently to display the resulting XR space, in which the user plays the game.

A typical SMM provided by such a device is a 3D representation, in the form of enormous numbers (tens or hundreds of thousands) of relatively small 2D polygons, of all visible and tangible surfaces in a given environment, such as within a house, in advance of the user commencing an XR game in a part of that environment, such as within one room of that house. By detecting and showing surfaces of all the physical elements actually present in the room of interest, open spaces between those elements may, of course, be inferred.

Sealed space meshes (SSMs) are generated using the same technologies as noted above for SMMs, but differ, as their name suggests, in being confined to a "sealed" environment, so that an XR space is sharply defined for the game (or other XR application) of interest. While including all the surfaces of real objects present within the space to be "sealed", the SMM also includes virtual walls, represented by enormous numbers of polygons just as real walls would be, at the boundaries of that space. This allows the virtual elements—which may be characters or inanimate objects—making up the XR game to be generated and to operate only within the confines of the SMM virtual walls.

Figure 2:
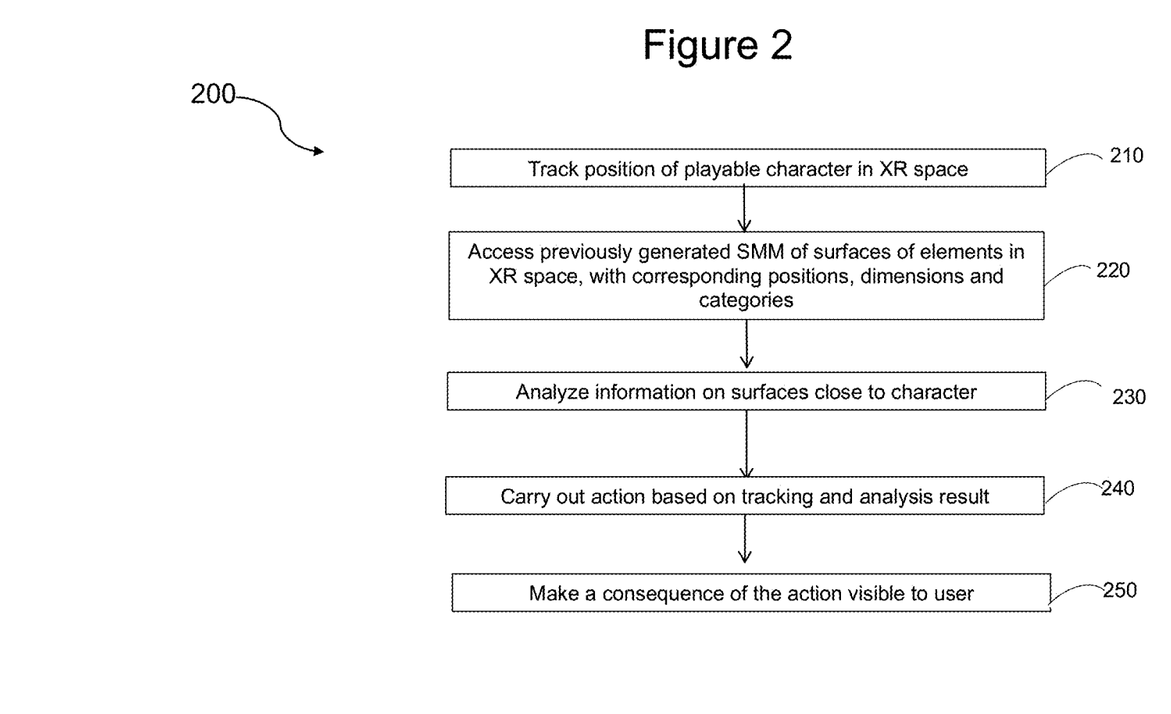
FIG. 2 is a flowchart of steps of a method to improve user understanding of an XR space, according to some embodiments.

FIG. 2 is a flowchart illustrating steps of a method 200 according to various embodiments of the present invention that address the general problem of providing users with an improved understanding of XR spaces in which they play video games, by taking advantage of information gleaned from spatial meshes.

At step 210, the position of a playable character is tracked in real time. In other embodiments the position of a non-player character or another virtual object of particular interest may be tracked instead of or as well as the position of a playable character, but these will not be discussed further herein. The basic ideas discussed in the context of method 200 could be extrapolated to deal with these other embodiments.

At step 220, a previously generated SMM of surfaces of physical elements in XR space, with corresponding positions, dimensions and some degree of categorization, is accessed. This may happen before, after, or simultaneously with the tracking carried out in step 210. If step 220 follows step 210 as shown in the figure, it may make sense to only access those parts of the SMM that concern surfaces in proximity to the tracked character, which may increase efficiency and/or speed.

At step 230, information from the SMM on one or more real surfaces within a predetermined distance of the user-controlled character is analyzed. In some embodiments, the predetermined distance may be expressed in terms of a dimension or other characteristic of the user-controlled character. For example, the distance might be within 2 or within 5 stride lengths for that characteristic. In some other embodiments, the predetermined distance may be expressed in terms of a dimension of the XR space, such as, for example, 20% of a perimeter. The distance limit serves to limit computational processing load.

In some embodiments, analyzing the information comprises identifying mesh artifacts in the SMM of the XR space. With current technology, imperfections are almost inevitably introduced into the polygons and arrangements of polygons that make up the meshes that represent exposed surfaces. These imperfections cause surface artifacts that are either directly visible (and therefore somewhat annoying) to the user, or may make themselves apparent via effects they have on characters interacting with those surfaces.

One fairly common type of mesh artifact arises when a smooth horizontal surface, probed by a surface sensing device during generation of the SMM, is represented in the resulting mesh by an uneven surface—one characterized by a significant surface roughness. Even if that roughness—artificial rather than naturally occurring—is too small to be directly visible to the user viewing the XR space, a character being driven by the user to move over that surface will typically react by following that surface roughness as they move, so that instead of a relatively even horizontal motion, the user may see the character moving up and down as well, in a bouncing or jerky motion, which is jarring to the user who can see that the actual real surface seems perfectly flat.

Another known type of mesh artifact arises when two real objects are in contact, but the mesh generation process misinterprets lines of contact as edges, and "splits" at least one of the surfaces into two or more surfaces. For example, the presence of a vase on a tabletop may lead to the mesh showing two or three slightly separated table surfaces around a surface representing the vase.

Figure 3:
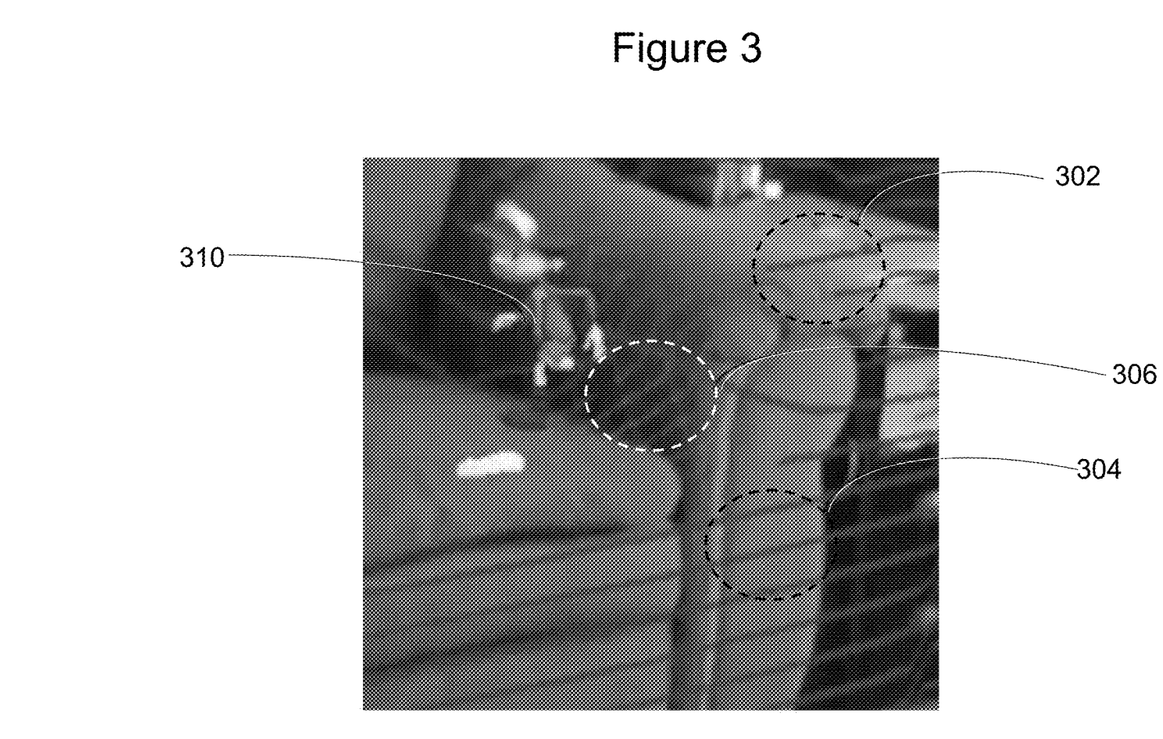
FIG. 3 illustrates how some embodiments may address an XR game scenario in which one type of mesh artifacts would otherwise cause movement artifacts.

A third type of mesh artifact arises when a virtual surface is introduced in error. In some cases this is done when attempting to represent a curved surface, such as a fabric covering a sofa cushion, for example; in others this may occur where two out-of-plane surfaces meet—often 90 degrees—but the meshing process fails to follow the angular change correctly and "cuts the corner" by interposing a virtual surface at some intermediate angle. FIG. 3 shows one example, indicating mesh areas 302 and 304, accurately representing portions of the top of a sofa arm and the front vertical edge of the sofa respectively, but also a mesh area 306 that follows a slanting surface that does not represent any real surface, but is indicative of a failure of the mesh to follow the vertical surface of the sofa arm where it meets the horizontal surface of the sofa seat. This can be a problem if it allows user-controlled character 310 to run along that slanting surface, which would appear to the user to simply be empty space.

In some embodiment, the analysis at step 230 comprises determining whether the user-controlled character is out of sight for the user, due to being positioned, at that moment at least, behind a real surface in the user's line of sight. In some cases, the analysis may instead (or in addition) include determining whether some other virtual item of interest to the user—a treasure being searched for, for example—is similarly hidden from the user's view.

At step 240, an action is carried out, based on results of the tracking and analysis.

Figure 4:
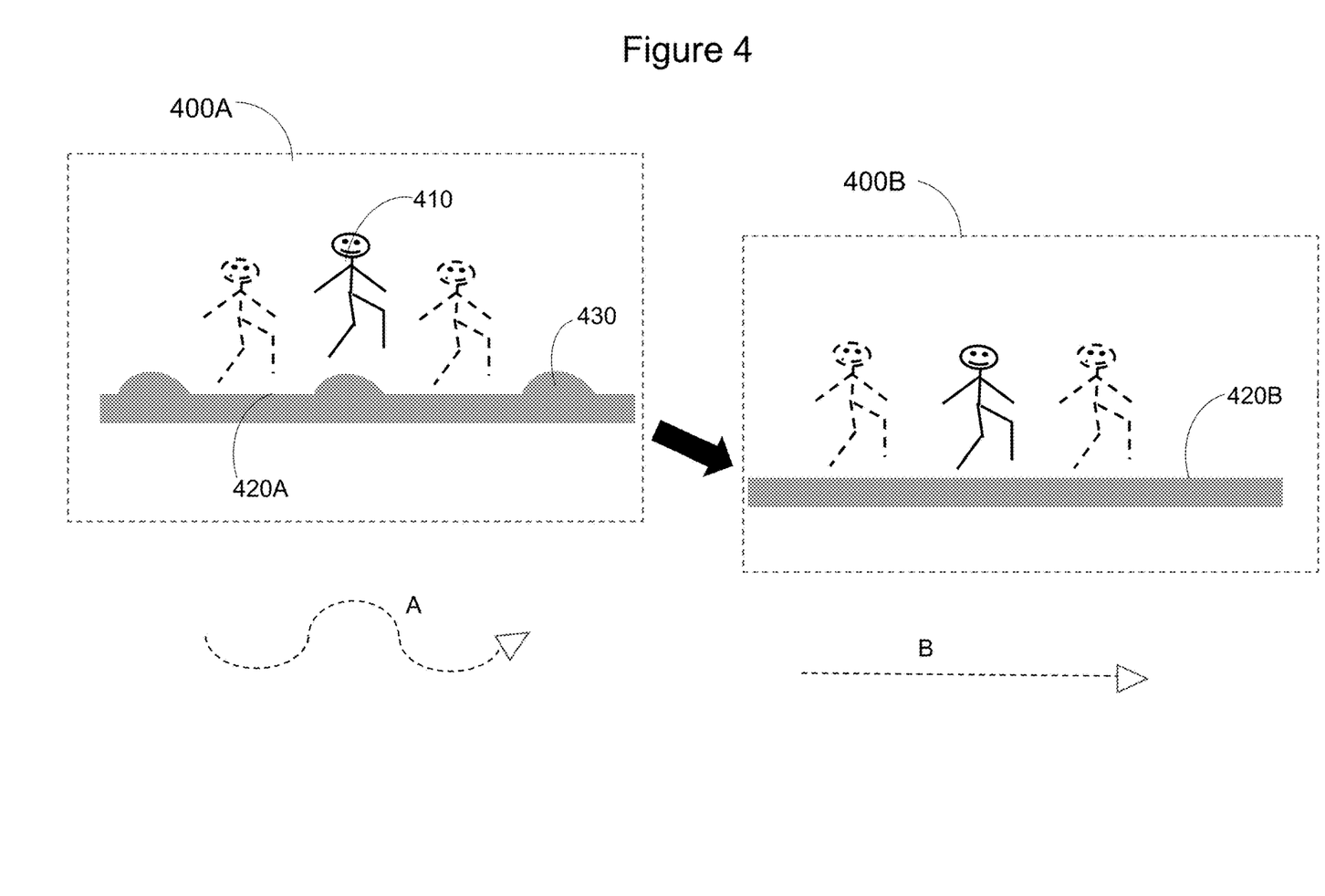
FIG. 4 illustrates how some embodiments may address an XR game scenario in which another type of mesh artifacts would otherwise cause movement artifacts.

In cases where mesh artifacts are detected during the analysis, in a surface in contact with or close to the character, the action taken may be to change the initial mesh to remove them, or at least to counteract their effects appropriately. Consider the surface roughness artifacts discussed above. Scenario 400A in FIG. 4 shows a scenario in which a character 410 is running over a surface 420A which is interrupted by a series of bumps 430A. In the absence of any action as disclosed herein, even though the user may direct the character to simply move horizontally over the surface from left to right (as seen in the figure) the character's trajectory will generally be forced to include ripples or bounces that roughly follow the contours of the bumpy surface, as indicated by dashed curve A. However, in embodiments of the present invention, an action, indicated by the solid diagonal arrow in the figure, changes the scenario to 400B, in which a smoothing function has been applied to mesh elements representing the surface, effectively removing the bumps to provide a smoothened surface 420B. This in turn flattens out the ripples or bounces in the character's motion, as indicated by dashed line B.

Similarly, if the surface artifacts discovered by analysis of the SMM of surfaces close to the character are ones of suspicious splitting, as discussed above, the action taken at step 240 of the method would be to reintegrate the split portions of the surface into a single surface. This may involve setting a threshold for a minimum gap, such as 5 mm for example, that must be exceeded to allow slightly separated surfaces to remain separate.

Figure 5:
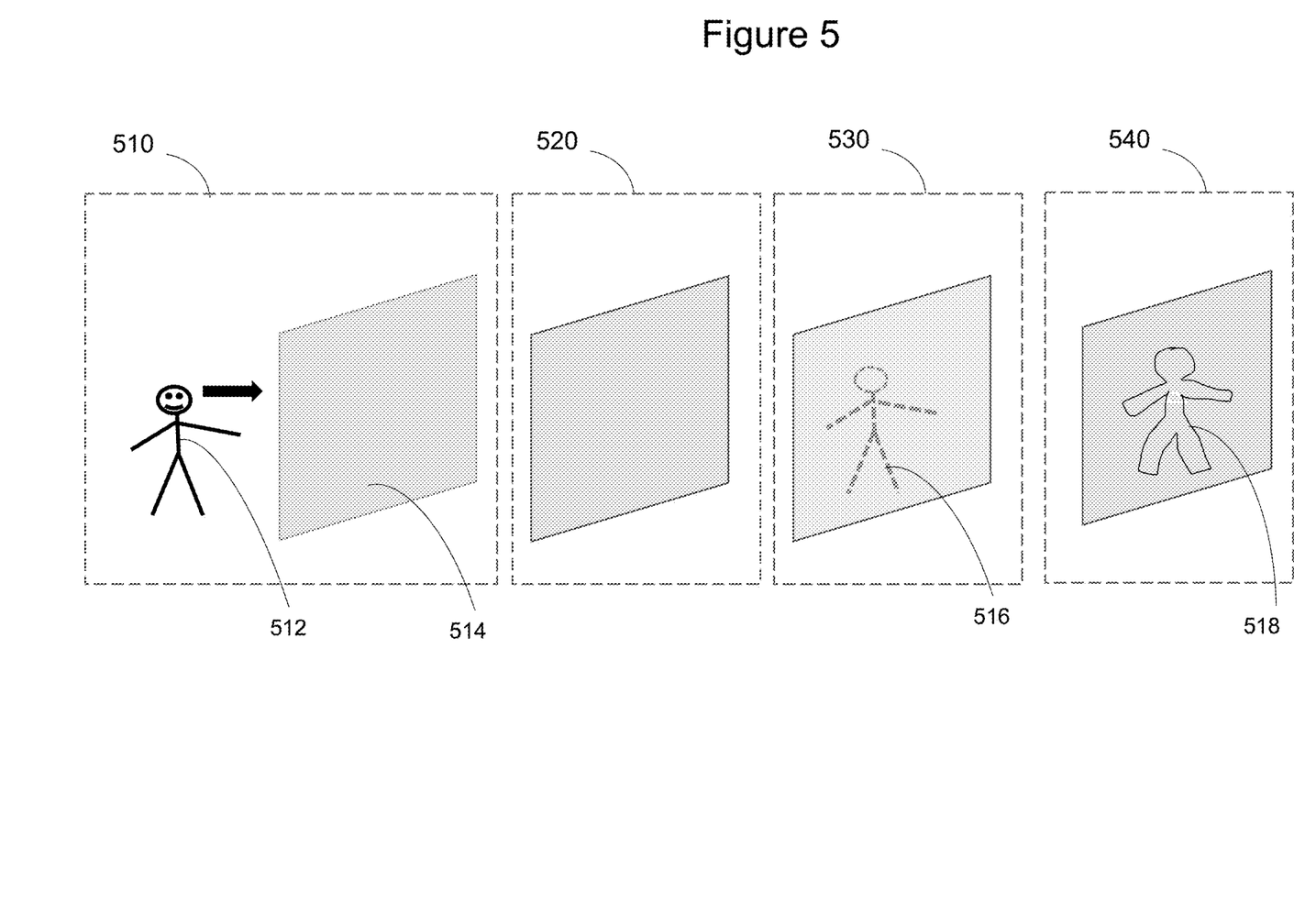
FIG. 5 illustrates how some embodiments may address an XR game scenario in which a player character would otherwise be lost from view from the user's viewpoint, because of an intervening real, opaque surface.

In cases where the surface artifacts discovered by analysis of the SMM of surfaces close to the character are ones indicting a virtual surface has been introduced mistakenly, during the mesh generation, the action taken at step 240 is to distinguish between mesh elements representing the virtual surface and other mesh elements representing real surfaces in the SMM In those embodiments in which the analysis at step 230 determines that a part or all of the user-controlled character is out of the user's sight because of an intervening real surface, the action taken may be to generate a projection representing, precisely or roughly, a shadow or outline of what might be seen by the user if that intervening real surface were suddenly rendered transparent. FIG. 5 illustrates the problem and the solution in an exemplary case. View 510 shows what a user might see just before a character 512 moves behind a surface 514, while view 520, corresponding to a slightly later time, shows that the same user would by then have lost sight of the character because of surface 514. View 516 is a hypothetical view of what the user might see if surface 514 were partially transparent. Then view 518 shows a rough outline that could be generated to roughly correspond to a projection of the character on surface 414. On seeing this outline, or more likely a smoother, more subtle version of it, the user would be able to locate the character, and then anticipate its re-emergence at the right hand edge of surface 514, or, if desired, direct the character to change direction or even retrace their steps to emerge back into view at the left hand edge of the surface.

At step 250 of method 200, a consequence of the action is made visible to the user. In the "corner cutting" mesh artifact example illustrated in FIG. 3, the consequence may be simply to make the extraneous virtual surface visible to the user, possibly by using bright colored lines following contours of the unreal introduced surface, or outlining mesh elements, to show the user why the user-controlled character's motions over that area may seem odd. In the "artificially rough" mesh artifact example illustrated in FIG. 4, the primary visible consequence is the smooth, relatively horizontal motion of the character moving over the surface, corresponding to the restored smoothness of that surface. In the occluded character example illustrated in FIG. 4, the visible consequence is the projected outline of the character in view 440.

Figure 6:
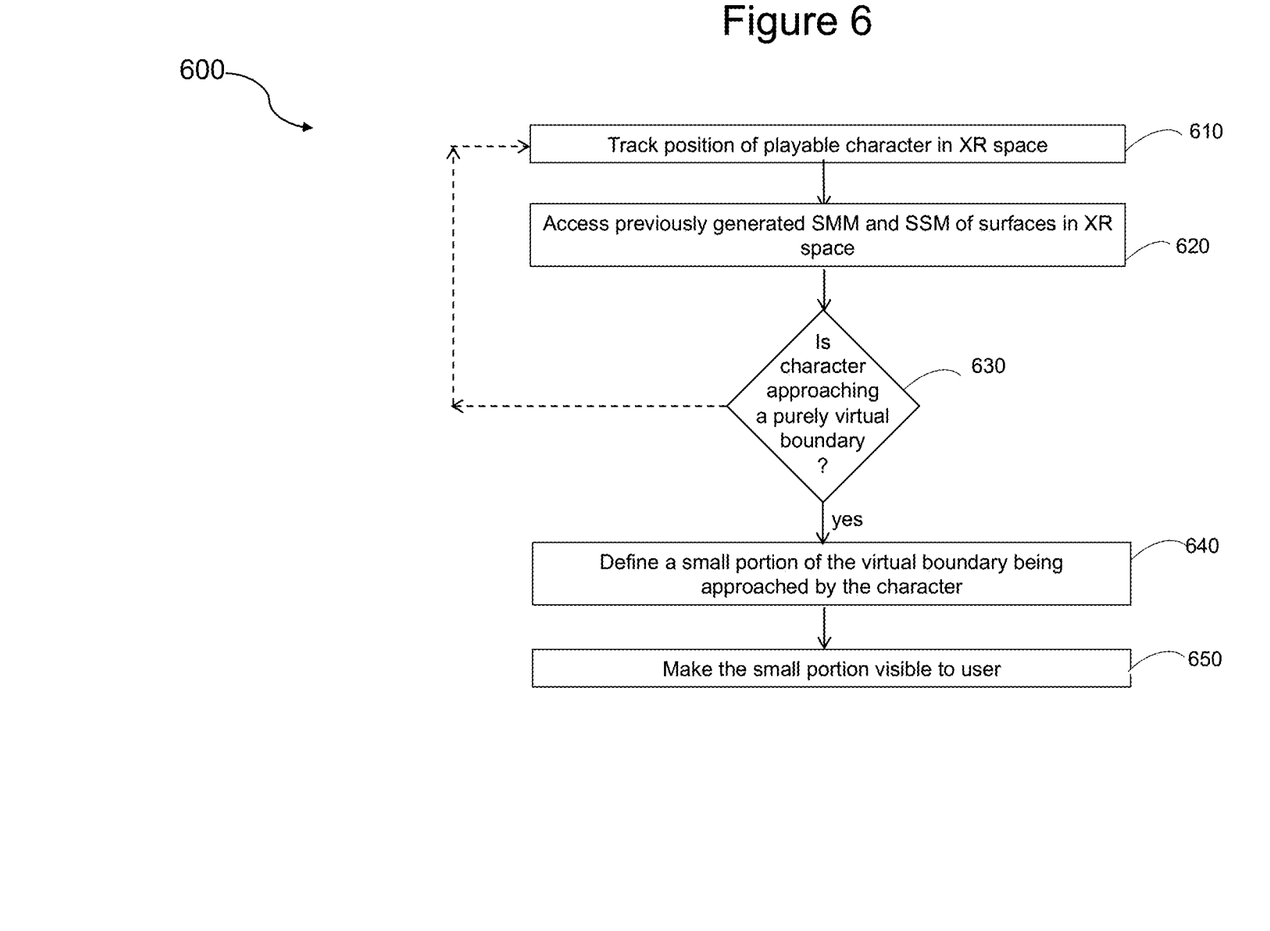
FIG. 6 is a flowchart of steps of a method to improve user understanding of an XR space, according to some other embodiments.

FIG. 6 is a flowchart illustrating steps of a method 500 according to embodiments of the present invention that address the problem of providing users with an improved understanding of the boundaries of XR spaces in which they play video games, by taking advantage of information gleaned from two types of spatial meshes.

At step 610, the position of a playable character is tracked in real time. In other embodiments the position of a non-player character or another virtual object of particular interest may be tracked instead of or as well as the position of a playable character, but these will not be discussed further herein. The basic ideas discussed in the context of method 200 could be extrapolated to deal with these other embodiments. Methods of tracking characters in video games are well known in the art, and will not be discussed further herein.

At step 620, a previously generated SMM of surfaces of physical elements in XR space, with corresponding positions, dimensions and some degree of categorization, is accessed, and a previously generated sealed space mesh (SSM) is also accessed. This may happen before, after, or simultaneously with the tracking carried out in step 610. If step 620 follows step 210 as shown in the figure, it may make sense to only access those parts of the SMM and SSM that concern surfaces in proximity to the tracked character, which may increase efficiency and/or speed.

At step 630, the information gleaned from steps 610 and 620 is used to establish whether the user-controlled character is approaching a virtual boundary of the SSM which does not coincide with any real physical surface in the SMM. If the answer is no, the method simply loops back to step 610.

If the character is found to be approaching a virtual boundary of the SSM which does not coincide with any real physical surface in the SMM, however, that means that the user may experience some cognitive dissonance—for example, if the character the user is directing towards that invisible boundary comes to an abrupt stop for no apparent reason. To avoid this sort of problem, method flow passes to step 640, at which a small portion of the virtual boundary being approached by the character is defined, and then to step 650, at which the small portion that was defined in step 640 is made visible to the user. In some embodiments, this is achieved by simply displaying a corresponding portion of the mesh of polygons in the SSM there. In other embodiments, the portion may be rendered visible by displaying a pattern there, or making that portion opaque, either uniformly or over a projected "shadow" of the character.

Figure 7:
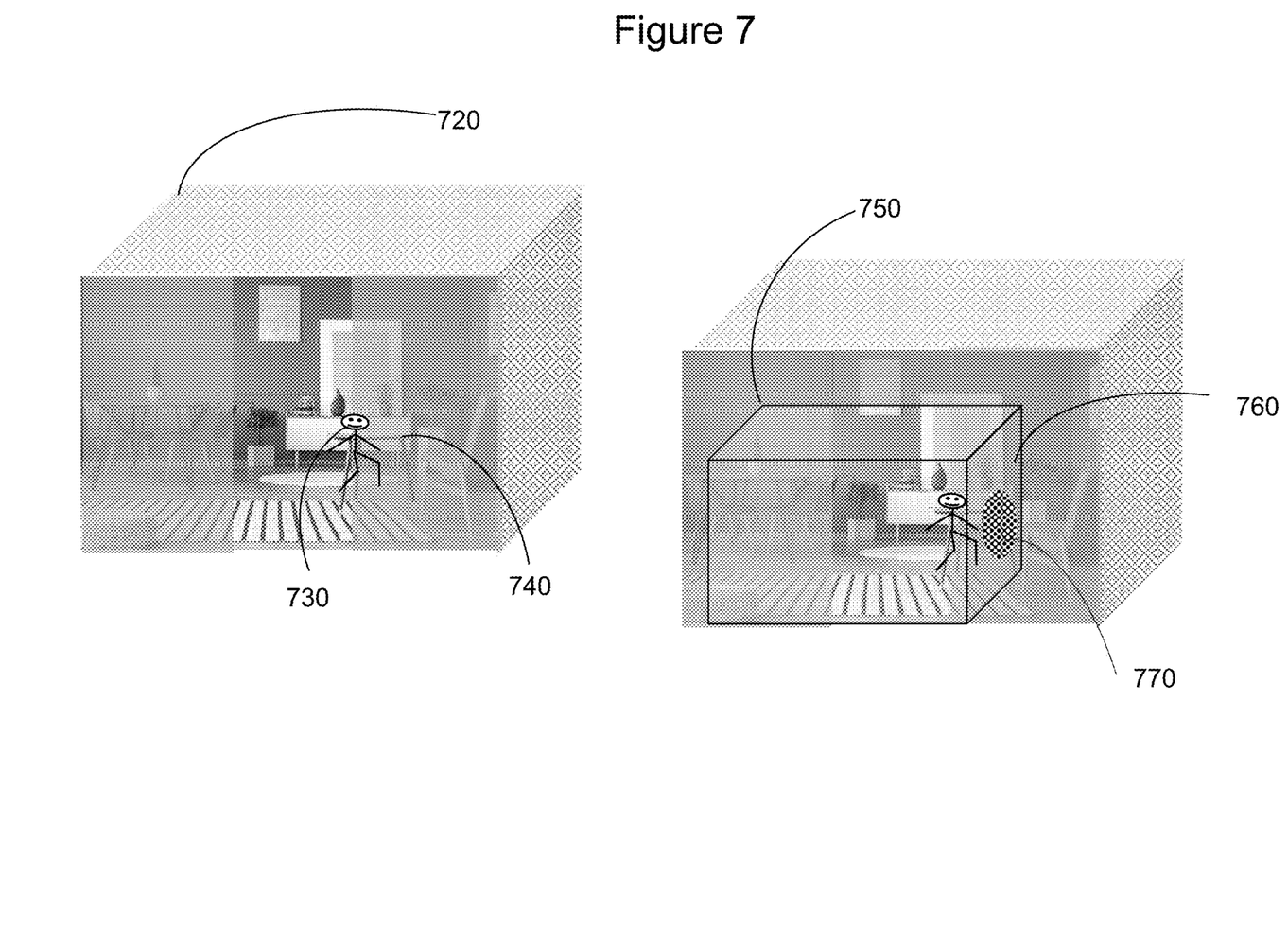
FIG. 7 illustrates how some embodiments may address an XR game scenario in which a player character would otherwise come to an unexpected halt at a virtual boundary.

FIG. 7 illustrates a scenario where the advantages of method 500 may be appreciated. On the left of the figure, a spatial mapping mesh 720 is seen, encompassing a large portion of a room containing many items of furniture. As an indication of the polygon mesh that covers all exposed real surfaces in the mesh, hatching is explicitly shown on two of those surfaces, the ceiling and the right hand wall. A virtual user-controlled character 730 is also shown, moving in front of a real table 740. The right of the figure shows the same room, but also shows a sealed space mesh 750 that defines the XR space in which the game is being played, bounded by a virtual ceiling, virtual floor and four virtual walls, including wall 760. Notice that wall 760 is positioned in a space that is completely empty in reality, although very close to table 740.

Prior to the present invention, the user might well have directed character 730 to continue moving from left to right, as the user would not be aware of wall 760. However, as virtual wall 760 is blocking the character's path, the XR game software could not allow the character to move "through" that wall, and the user would find their intentions thwarted for no obvious reason. However, if method 600 of the present invention were to be applied, the trajectory of the character approaching wall 760 would be tracked, the analysis would reveal that there are no real surfaces (known from the SMM) coincident with virtual wall 760 (known from the SSM), and a portion of that virtual wall would be made visible to the user, in this case by showing a hatched oval region 770 on the wall's surface. The user could then deliberately slow the character down and/or stop the character moving forward, possibly making them then jump up to sit on the edge of table 740, or turning them around to move back to the left hand side of the room. Even if the user does not take charge of the situation in this way, and the game automatically brings the character to a stop, it is likely to be less annoying to the user who realizes the cause—by seeing that that a boundary of playable space has been reached.

Now consider another type of scenario that may be helped by some other embodiments of the present invention. Examples of such scenarios are those where the user has somehow lost track of a character of interest, with or without any intervening real surface being present, or is struggling to find some other virtual object of interest in a crowded XR environment. Without some help, the user may simply lose interest in the game and give up. However, in some embodiments of the present invention, some of the ideas discussed above may be extended such that, if the user inputs a request for help, for example by pressing a "find my character" button on a game controller, the analysis performed at step 230 of method 200 can be used to precisely determine a current position of the character relative to a current effective position of the user in the XR space. Then step 240 could determine a way of drawing attention to that position, for example by means of words or a symbol like an arrow or a bulls eye, and step 250 could display the words or the symbol (or both) to the user, superimposed on the user's view of the XR space. In some embodiments, the analysis and action could involve finding a good path for the character (or the user) to follow from their current position to reach an object of interest, and a graphical indication of that path could be overlaid on the display as guidance for the user.

Figure 8:
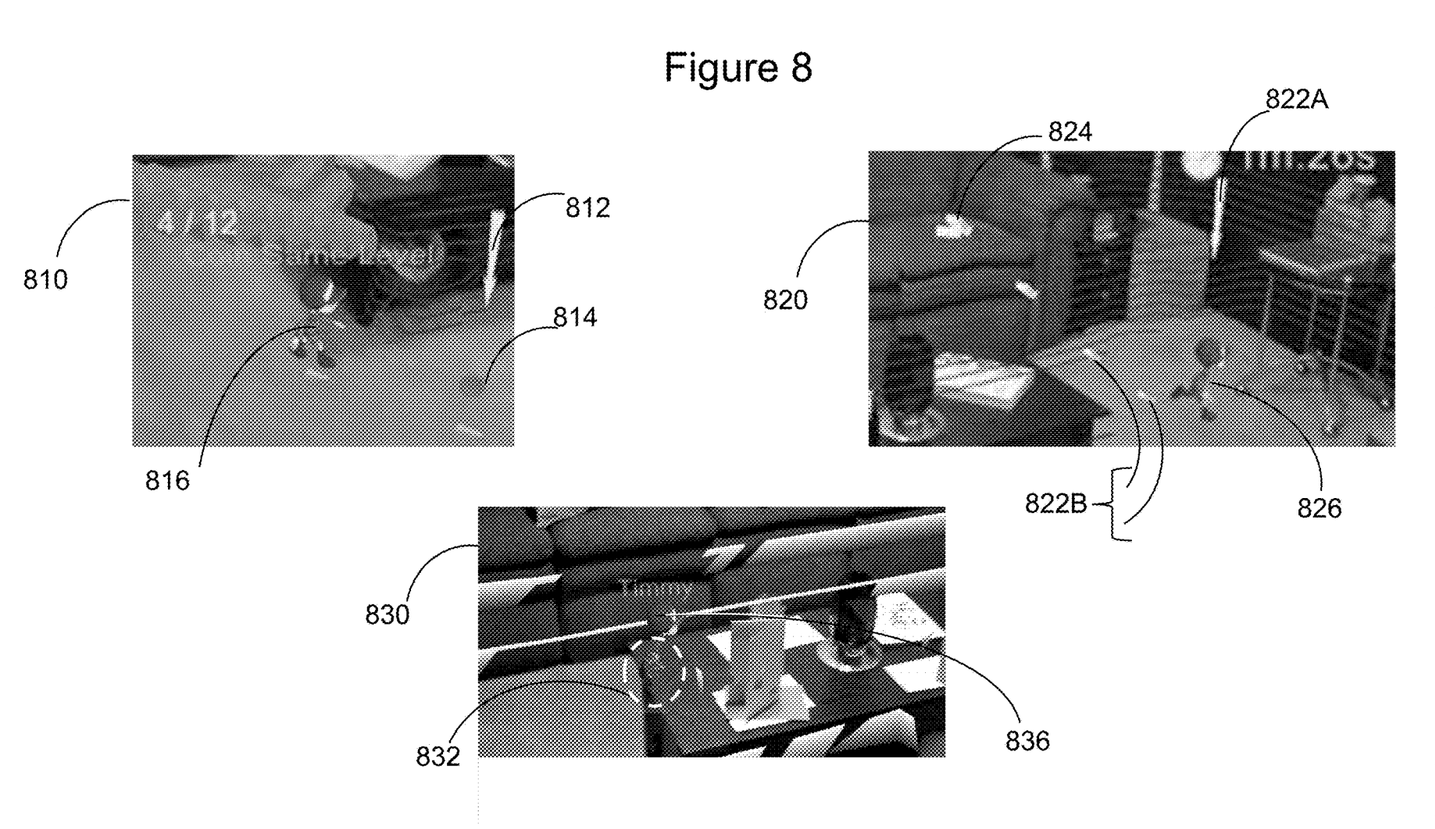
FIG. 8 shows screenshots, taken from games under development, showing the visible results of some embodiments.

FIG. 8 shows three screenshots taken from a game under development. At the top left, image 810 shows one example where a bright arrow 812 is overlaid on the game display viewed by the use, pointing directly to the current position of an object 814 that character 816 wants to find. At the top right, image 820 shows an example displaying the same sort of arrow indication 822A of where the character 826 is, but also a series of white arrows (the first two are shown as 822B) indicating a simple path that the character could take to approach the desired object 8824.

The third image, 830, in FIG. 8 is an image showing a scenario of a type discussed earlier, involving losing sight of part or all of a virtual character behind a real surface. In this case, only the head of character 836 remains visible, while his body from the neck down is hidden because the character has moved behind a low intervening table, but the current position of the neck-down portion of his body is indicated graphically, in this case by a mesh 832 projected onto a surface of that table, so that it is visible to the user.

Embodiments of the present invention provide many benefits. In general terms, methods described above allow a user of an XR environment, which may be a room, in the user's home or business premises for example, in which a spatial mapping mesh has been made, to experience a greater sense of immersion in that XR space than would otherwise be likely, by being provided with means to better understand the XR space. In some cases this is achieved by manipulating the underlying mesh to prevent artifacts that would cause confusion; in others by displaying graphical overlays to the scene viewed by user, that provide clues or guidance as appropriate for various common scenarios.

Embodiments described above are efficient in their use of computing resources by limiting their use where possible to address surfaces in the local vicinity of the moving character, rather than trying to address all surfaces within the XR space. This helps to keep the processor load to manageably low levels.

As noted earlier, the present invention is not limited to games alone. Shopping and navigation-focused apps are examples of non-gaming applications that may be envisaged.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for providing a user with an improved understanding of an XR space in which the user is playing a video game, the method comprising:
    continuously tracking a user-controlled character in the video game;
    accessing a previously generated spatial mapping mesh (SMM) of surfaces of real elements present in the XR space, with corresponding positions and dimensions;
    analyzing information from the SMM on one or more real surfaces within a predetermined distance of the user-controlled character;
    carrying out an action based on a tracked position of the user-controlled character and, at least in part, on a result of the analysis; and
    making a consequence of the action visible to the user.

2. The method of claim 1, wherein analyzing the information comprises identifying mesh artifacts in the SMM.

3. The method of claim 2,
    wherein if the mesh artifacts comprise an artificial unevenness in a real surface over which the user-controlled character is moving:
    the action comprises applying a smoothing function to mesh elements representing the real surface, providing a smoothened surface, with a corresponding effect on motion of the user-controlled character; and
    a consequence of the action is made visible to the user by displaying the smoothened surface instead of the artificially uneven surface, and displaying a correspondingly smoothened motion of the user-controlled character over the smoothened surface.

4. The method of claim 2,
    wherein if the mesh artifacts comprise an artificial splitting of a real surface into two or more surfaces:
    the action comprises combining the two or more surfaces to form a single surface; and
    a consequence of the action is made visible to the user by displaying the single surface instead of the two or more surfaces.

5. The method of claim 2,
    wherein if the mesh artifacts comprise introducing a virtual surface spatially separate from any real surface:
    the action comprises distinguishing between mesh elements representing the virtual surface and all mesh elements representing real surfaces in the SMM; and
    a consequence of the action is made visible to the user by displaying the mesh elements representing the virtual surface, and preventing the user-controlled character from appearing to be in physical contact with the virtual surface.

6. The method of claim 1, wherein analyzing the information comprises determining whether the user-controlled character is positioned relative to a real surface such that the user-controlled character is out of sight for the user.

7. The method of claim 6,
wherein if it is determined that the user-controlled character is not in a line of sight of the user:
the action comprises determining a corresponding outline of the user-controlled character that would be visible in the absence of the real surface; and
a consequence of the action is made visible by displaying the outline on the real surface.

8. The method of claim 1, wherein analyzing the information comprises determining whether a virtual element of interest to the user-controlled character is positioned relative to a real surface such that the virtual element is out of sight for the user.

9. The method of claim 8,
wherein if it is determined that the virtual element is not in a line of sight of the user:
the action comprises determining a corresponding outline of the virtual element that would be visible in the absence of the real surface; and
a consequence of the action is made visible by displaying the outline on the real surface such that the outline is visible to the user.

10. The method of claim 1, additionally comprising:
accessing a previously generated sealed space mesh (SSM) in which the XR space is defined, providing dimensions and positions of virtual boundaries of the SSM;
wherein analyzing the information comprises determining whether the user-controlled character is approaching a virtual boundary of the XR space which does not coincide with a real surface.

11. The method of claim 10, wherein if it is determined that the user-controlled character is approaching a virtual boundary of the XR space which does not coincide with a real surface:
the action comprises defining a small portion of the virtual boundary being approached; and
a consequence of the action is made visible by displaying a portion of mesh at the small portion of the virtual boundary.

12. The method of claim 1, wherein if a request is received from the user for help locating the user-controlled character:
the action comprises creating an indication of a current position of the user-controlled character in the XR space; and
a consequence of the action is made visible by displaying the indication.

13. The method of claim 1, wherein if a request is received from the user for help locating a virtual item of interest:
the action comprises at least one of creating an indication of a current position of the virtual item in the XR space, and creating a path indication of a possible path between a current position of the user-controlled character and the current position of the virtual item; and
a consequence of the action is made visible by displaying the indication.

14. A system for providing a user with an improved understanding of an XR space in which the user is playing a video game, the system comprising:
one or more processors; and
logic encoded in one or more non-transitory media for execution by the one or more processors and when executed operable to:
continuously track a user-controlled character in the video game;
access a previously generated spatial mapping mesh (SMM) of surfaces of real elements present in the XR space, with corresponding positions and dimensions;
analyze information from the SMM on one or more real surfaces within a predetermined distance of the user-controlled character;
carry out an action based on a tracked position of the user-controlled character and, at least in part, on a result of the analysis; and
make a consequence of the action visible to the user.

15. The system of claim 13, wherein analyzing the information comprises identifying mesh artifacts in the SMM.

16. The system of claim 14,
wherein if the mesh artifacts comprise an artificial unevenness in a real surface over which the user-controlled character is moving:
the action comprises applying a smoothing function to mesh elements representing the real surface, providing a smoothened surface, with a corresponding effect on motion of the user-controlled character; and
a consequence of the action is made visible to the user by displaying the smoothened surface instead of the artificially uneven surface, and displaying a correspondingly smoothened motion of the user-controlled character over the smoothened surface.

17. The system of claim 13, wherein analyzing the information comprises determining whether the user-controlled character is positioned relative to a real surface such that the user-controlled character is out of sight for the user.

18. The system of claim 13,
wherein if it is determined that the user-controlled character is not in a line of sight of the user:
the action comprises determining a corresponding outline of the user-controlled character that would be visible in the absence of the real surface; and
a consequence of the action is made visible by displaying the outline on the real surface.

19. The system of claim 13,
wherein analyzing the information comprises determining whether a virtual element of interest to the user-controlled character is positioned relative to a real surface such that the virtual element is out of sight for the user.

20. The system of claim 18,
wherein if it is determined that the virtual element is not in a line of sight of the user:
the action comprises determining a corresponding outline of the virtual element that would be visible in the absence of the real surface; and
a consequence of the action is made visible by displaying the outline on the real surface such that the outline is visible to the user.

* * * * *